Patented Feb. 3, 1931

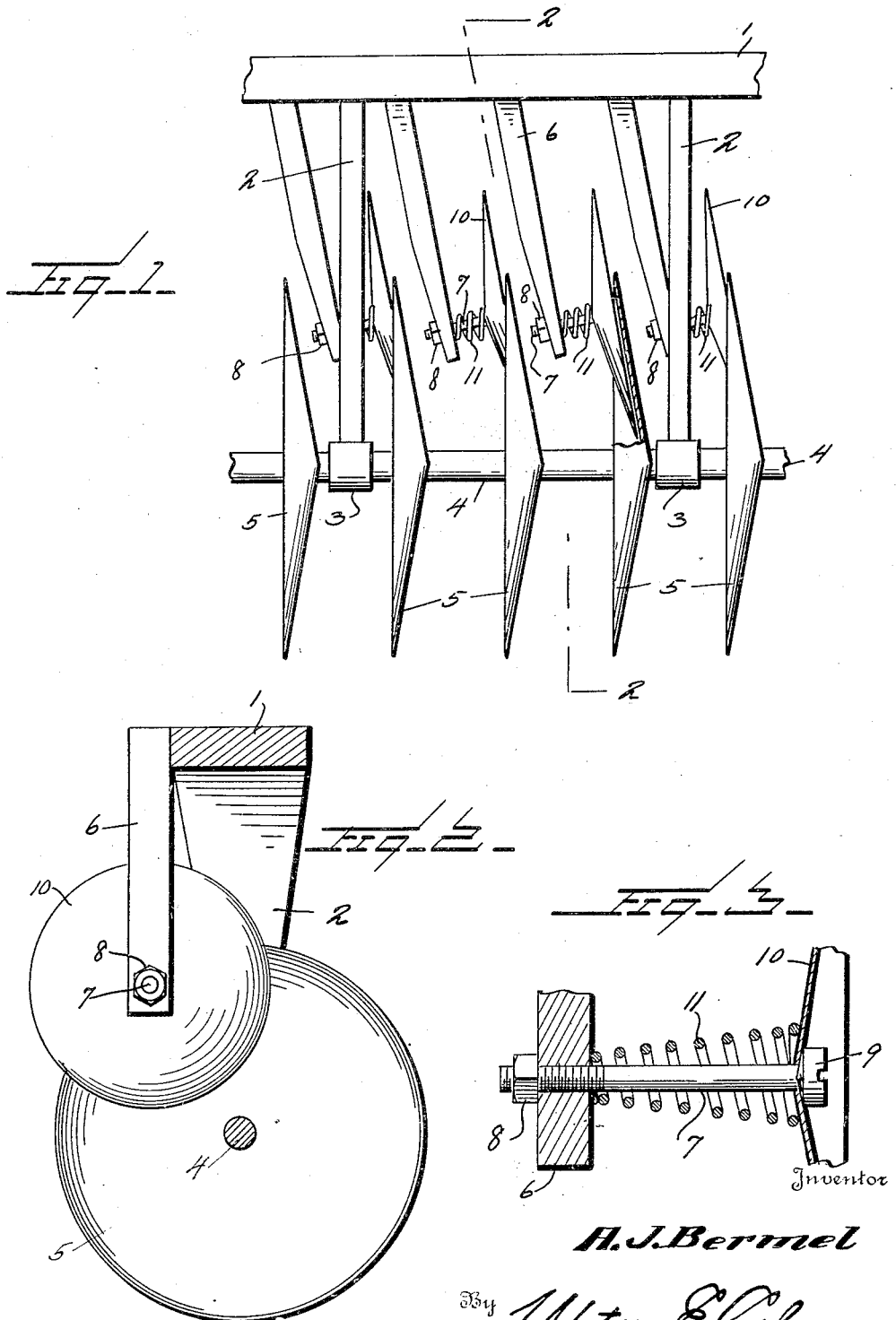

1,791,462

UNITED STATES PATENT OFFICE

ANTHONY JOHN BERMEL, OF BRULE, NEBRASKA

CULTIVATOR-DISK CLEANER

Application filed June 5, 1928, Serial No. 282,954. Renewed June 24, 1930.

This invention relates to agricultural machinery and pertains particularly to an improved means for cleaning disks of disk carrying machines.

Disk carrying agricultural machines of the type at present in use are provided with cleaner or scraper elements in the form of rigid blades which are held against the inner face of the disks to cut therefrom mud which has adhered thereto. With this type of cleaner or scraper, when the disks become heavily coated with sticky soil, the scraper will not properly act to clean the same therefrom through the wedging of the soil and other matter between the blade and disk. When this happens the disks drag, making the pulling of the machine materially harder. At the same time, the disks will be prevented from properly penetrating the earth and the seed dropping from a planter will fall upon improperly opened or unopened ground.

By the use of the structure embodying the present invention, the difficulties above enumerated are overcome. In view of the foregoing it will be seen that one of the primary objects of the present invention is to provide an improved means whereby the disks of disk carrying earth working machinery may be kept clean at all times.

A further object of the invention is to provide a cleaning means for cultivating disks which will not jam or otherwise become inoperative and interfere with the proper working of the disks.

The invention will be best understood from a consideration of the following detailed description taken in connection with the accompanying drawings forming part of this specification, with the understanding, however, that the invention is not confined to any strict conformity with the showing of the drawings but may be changed or modified, so long as such changes or modifications mark no material departure from the salient features of the invention as expressed in the appended claims.

In the drawing:—

Figure 1 is a front elevational view of a portion of a disk cultivator showing the cleaning disks embodying the present invention attached thereto;

Figure 2 is a transverse section taken upon the line 2—2 of Figure 1;

Figure 3 is a detail sectional view taken through the central portion of one of the cleaning disks and the supporting members, therefor.

Referring to the drawing in detail wherein like numerals of reference indicate corresponding parts throughout the several views, the numeral 1 indicates the frame beam of a disk cultivator, which carries in the usual manner the depending arms 2 which carry at their lower ends the bearings 3. The bearings of the alined arms 2 support the usual disk shaft 4 carrying the earth working disks 5.

The particular disk cleaning structure, embodying the present invention, comprises a supporting arm 6 which may be carried by the disk frame 1, one each of these arms being provided for each disk of the machine, the lower end of which carries a bolt or screw 7 which is maintained at a slight inclination through the inclined positioning of the supporting arm 6.

The bolt 7 extends in the same general direction as the disk supporting shaft 4 and has one end in threaded connection with the supporting arm 6 and passing therethrough and carrying the locking nut 8 by means of which it may be held in adjusted position. Supported upon the free or head end of the bolt 7 and normally bearing against the head of the same, which head is indicated by the numeral 9, is a concave disk 10, the concave face of which is directed toward and in close proximity to the concave face of a disk 5. The disk 10, which is the cleaning element, is maintained in position against the supporting bolt head 9 by a cone-shaped coil spring 11, the small end of which bears against the supporting arm 6 while the larger end bears against the convex surface of the disk.

The arm 6 which supports the disk is directed toward the rear of the machine slightly so that when the soil adhering to the cultivating disk engages the cleaner disk the edge of the same will be drawn inwardly to contact with the cutting edge of the cultivator disk for scraping contact with the same.

Slight rotary motion will be imparted to the cleaning disk 10 when the same is engaged by earth carried upon the cultivator disk, thus causing the same to have a shearing cleaning action, the rotary motion of the cleaner disk being counter to the direction of rotation of the cultivator disk. It is, of course, apparent that slight play must be allowed for in the cleaning disk upon its supporting bolt so that the lower edge, which is normally free from contact with the cultivator disk, can be drawn inwardly when earth adhering to the cultivator disk comes into contact therewith. When this occurs it will be seen that the control spring 11 will expand upon the lower side while the upper side is compressed. As soon as the earth has been cleaned from the cultivator disk, the spring exerts its influence to arrange the cleaner disk in proper position upon the bolt and against the bolt head, free from contact with the cultivator disk.

While, in the majority of cases, it has been found that the cleaner disk rotates slightly when in engagement with the cultivator disk, and counter thereto, it has also been found that when the cleaner disk is used in connection with certain types of cultivators where the disks penetrate deeply into the ground, the lowermost portion of the edge of the cleaner disk contacts with the ground and is caused to rotate in the direction of rotation of the cultivator disk adjacent which it lies.

By reason of the longitudinal adjustment which can be made of the cleaning disk supporting bolt, the cleaning disk can be moved relative to the cultivator disk to increase or decrease the amount of space between the same.

The cleaner disk is preferably made materially smaller than the cultivator disk in connection with which it is used, it having been found that a disk of a diameter substantially half the diameter of the cultivator disk works best.

While the disk supporting arms 6 have been shown in the drawing as being straight, they may be curved to adapt the cleaner to certain types of disk machines where straight arms cannot be used.

While the present invention as herein described has been shown in association with a disk cultivator, it is, of course, to be understood that it is not limited to such use but may be employed in connection with disk machinery wherever it may be found serviceable.

Having described my invention, what I claim is:—

1. A cleaning attachment for a concave earth working disk, comprising a cleaning disk arranged in close proximity to but spaced from the concave face of the earth working disk, means for supporting the cleaning disk to rotate about an axis extending at an angle to the axis of the earth working disk, and means for resiliently maintaining the cleaning disk in a predetermined position with respect to the earth working disk.

2. The combination with a rotary earth working disk, of a cleaner comprising a supporting arm, a cleaner disk carried by said arm and normally arranged in close proximity to the earth working disk, and designed to be oscillated to contact with the edge thereof by earth carried thereby, and means for freeing the cleaner disk from contact with the earth working disk after the latter has become clean.

3. The combination with a rotary earth working disk of a cleaner comprising a support, a cleaner disk pivotally mounted on said support adjacent but normally spaced from the earth disk, and having free swinging movement thereon whereby its edge may be brought into engagement with the earth disk, and a resilient element engaging the cleaner disk and its support and opposing the said swinging movement of the cleaner disk.

4. A cleaning device for cultivator disks, comprising a disk body, a supporting arm, a supporting element carried by and extending from said arm and having said disk body centrally rotatably mounted and shiftable and oscillatable thereon to be supported thereby in close proximity to the inner face of a cultivator disk, and yieldable means designed to normally urge the cleaner disk toward the cultivator disk.

5. A cleaner for an earth working disk, comprising a rotatably mounted cleaning disk, supporting means designed to maintain the same in close proximity to but spaced from the earth working disk, and means normally controlling the cleaning disk designed to permit the same to be drawn against the edge of the earth working disk, when engaged by earth carried by the latter.

6. The combination with an earth working disk, of a cleaner disk mounted in close proximity to, but spaced from an earth working disk, and means for normally holding the cleaner disk in the first mentioned position, but yieldable to permit it to be brought into engagement with the earth disk.

In testimony whereof I hereunto affix my signature.

ANTHONY JOHN BERMEL.